US 12,036,430 B2

(12) United States Patent
DeNunzio

(10) Patent No.: US 12,036,430 B2
(45) Date of Patent: Jul. 16, 2024

(54) SYSTEMS AND METHODS OF REAL-TIME ELECTRONIC FIRE SPRINKLER LOCATION AND ACTIVATION

(71) Applicant: Tyco Fire Products LP, Cranston, RI (US)

(72) Inventor: Cassandra Lyn DeNunzio, Cranston, RI (US)

(73) Assignee: Tyco Fire Products LP, Cranston, RI (US)

( * ) Notice: Subject to any disclaimer, the term of this patent is extended or adjusted under 35 U.S.C. 154(b) by 0 days.

(21) Appl. No.: 18/446,154

(22) Filed: Aug. 8, 2023

(65) Prior Publication Data
US 2023/0381564 A1    Nov. 30, 2023

Related U.S. Application Data

(63) Continuation of application No. 17/056,054, filed as application No. PCT/US2019/033086 on May 20, 2019, now Pat. No. 11,752,382.
(Continued)

(51) Int. Cl.
*A62C 37/44*    (2006.01)
*G01S 5/04*     (2006.01)
*G01S 5/14*     (2006.01)

(52) U.S. Cl.
CPC ............... *A62C 37/44* (2013.01); *G01S 5/14* (2013.01)

(58) Field of Classification Search
CPC .................... A62C 37/44; G01S 5/14
See application file for complete search history.

(56) References Cited

U.S. PATENT DOCUMENTS 5,751,209 A * 5/1998 Werner ............. G08B 29/16
                                                340/517
8,842,016 B1 * 9/2014 Cazanas ............ G06Q 10/20
                                                42/70.07
(Continued)

FOREIGN PATENT DOCUMENTS

EP    2 293 852        3/2011
EP    3 321 908 A1     5/2018
(Continued)

OTHER PUBLICATIONS

International Search Report and Written Opinion for International Application No. PCT/US2019/033086, mail date Jul. 25, 2019, 8 pages.

*Primary Examiner* — Joseph A Greenlund
(74) *Attorney, Agent, or Firm* — Foley & Lardner LLP

(57) ABSTRACT

An electronic fire sprinkler system includes a plurality of electronic fire sprinklers that each output a flow of fluid in response to receiving an activation signal, a plurality of temperature sensors that each detect a temperature and output an indication of the detected temperature, a plurality of network devices that detect a distance to at least one of the plurality of electronic fire sprinklers, and a processing circuit. The processing circuit receives a plurality of detected distances, calculates a location of each electronic fire sprinkler based on the of detected distances, determines that a fire condition is present based on the detected temperature, identifies one or more of the plurality of electronic fire sprinklers based on the calculated locations and an identifier of the temperature sensor from which the indication of the detected temperature was received, and transmits one or more activation signals to the identified electronic fire sprinklers.

20 Claims, 4 Drawing Sheets

Related U.S. Application Data

(60) Provisional application No. 62/674,468, filed on May 21, 2018.

(56) References Cited

U.S. PATENT DOCUMENTS

| | | | | |
|---|---|---|---|---|
| 9,520,247 | B1* | 12/2016 | Finnegan | H01H 3/22 |
| 10,441,830 | B2* | 10/2019 | Magnone | A62C 37/36 |
| 10,852,202 | B2* | 12/2020 | Birnkrant | G08B 29/185 |
| 10,957,176 | B2* | 3/2021 | Birnkrant | G08B 13/187 |
| 11,127,270 | B2* | 9/2021 | Birnkrant | G08B 17/06 |
| 11,132,883 | B2* | 9/2021 | Birnkrant | G08B 13/186 |
| 11,135,330 | B1* | 10/2021 | Craig | A61L 2/22 |
| 11,145,177 | B2* | 10/2021 | Birnkrant | G08B 13/186 |
| 11,151,853 | B2* | 10/2021 | Birnkrant | G08B 17/107 |
| 11,361,654 | B2* | 6/2022 | Vijayakumari Mahasenan | H04L 12/1868 |
| 11,465,004 | B2* | 10/2022 | Trivelpiece | A62C 37/10 |
| 2007/0221388 | A1* | 9/2007 | Johnson | A62C 37/44 169/42 |
| 2016/0303412 | A1* | 10/2016 | Schmitt | A62C 37/44 |
| 2016/0352575 | A1* | 12/2016 | Frison | H04W 72/30 |
| 2017/0113078 | A1* | 4/2017 | Magnone | A62C 35/60 |
| 2017/0187783 | A1* | 6/2017 | Pogorelik | H04L 67/12 |
| 2019/0019387 | A1* | 1/2019 | Birnkrant | G08B 17/107 |
| 2019/0287366 | A1* | 9/2019 | Birnkrant | G08B 17/107 |
| 2020/0155882 | A1* | 5/2020 | Tohidi | G06N 7/01 |
| 2020/0196110 | A1* | 6/2020 | Jakobsson | H04W 76/14 |
| 2020/0226916 | A1* | 7/2020 | Lim | G08B 17/06 |
| 2021/0008583 | A1* | 1/2021 | Smith | B05B 12/006 |
| 2021/0077844 | A1* | 3/2021 | DeNunzio | A62C 37/40 |
| 2021/0287318 | A1* | 9/2021 | Sterpin | H04W 4/33 |
| 2021/0299499 | A1* | 9/2021 | Hofmann | A62C 37/40 |
| 2022/0305315 | A1* | 9/2022 | Dusing | A62C 37/04 |
| 2023/0036315 | A1* | 2/2023 | Savage, Jr. | A62C 37/04 |
| 2023/0271045 | A1* | 8/2023 | DeNunzio | A62C 37/10 169/46 |

FOREIGN PATENT DOCUMENTS

| | | |
|---|---|---|
| WO | WO-2007/048144 | 4/2007 |
| WO | WO-2015/195974 | 12/2015 |
| WO | WO-2018/089636 A1 | 5/2018 |

* cited by examiner

SYSTEMS AND METHODS OF REAL-TIME ELECTRONIC FIRE SPRINKLER LOCATION AND ACTIVATION

CROSS-REFERENCE TO RELATED APPLICATIONS

The present application claims priority to and is a continuation of U.S. patent application Ser. No. 17/056,054, filed Nov. 17, 2020, titled "SYSTEMS AND METHODS OF REAL-TIME ELECTRONIC FIRE SPRINKLER LOCATION AND ACTIVATION", which is a U.S. National Stage Entry of Application PCT/US2019/033086, filed May 20, 2019, titled "SYSTEMS AND METHODS OF REAL-TIME ELECTRONIC FIRE SPRINKLER LOCATION AND ACTIVATION", which claims the benefit of and priority to U.S. Provisional Application No. 62/674,468, filed May 21, 2018, titled "SMART SPRINKLER TECHNOLOGY IN FIRE PROTECTION: REAL-TIME LOCATION SYSTEM AND FIRE SPRINKLERS," the disclosures of each of which are incorporated herein by reference in their entirety.

BACKGROUND

Fire sprinklers are used to deliver fluid to a location at which a fire may be taking place. Fire sprinklers can be actuated in response to trigger conditions, such as smoke or heat. Electronic fire sprinklers can be actuated using an electric impulse.

SUMMARY

At least one aspect relates to an electronic fire sprinkler system. The electronic fire sprinkler system includes a plurality of electronic fire sprinklers that each output a flow of fluid in response to receiving an activation signal, a plurality of temperature sensors that each detect a temperature and output an indication of the detected temperature, a plurality of network devices that detect a distance to at least one of the plurality of electronic fire sprinklers, and a processing circuit that receives a plurality of detected distances from the plurality of network devices, executes a trilateration algorithm to calculate a location of each electronic fire sprinkler based on the plurality of detected distances, determines that a fire condition is present based on the indication of the detected temperature, identifies one or more of the plurality of electronic fire sprinklers based on the calculated locations and an identifier of the temperature sensor from which the indication of the detected temperature was received, and transmits one or more activation signals to the identified one or more of the plurality of electronic fire sprinklers to cause the identified one or more of the plurality of electronic fire sprinklers to output one or more corresponding flows of fluid.

At least one aspect relates to a method. The method includes detecting, by each of a plurality of sensors, a temperature and outputting an indication of the detected temperature. The method includes detecting, by a plurality of network devices, a distance to at least one electronic fire sprinkler of a plurality of electronic fire sprinklers. The method includes determining, by one or more processors, a location of each electronic fire sprinkler by applying trilateration to the plurality of detected distances. The method includes detecting, by the one or more processors, a fire condition based on the indication of the detected temperature. The method includes identifying, by the one or more processors, one or more of the plurality of electronic fire sprinklers based on the determined locations and an identifier of the temperature sensor from which the indication of the detected temperature was received. The method includes transmitting, by the one or more processors, one or more activation signals to the identified one or more of the plurality of electronic fire sprinklers to cause the identified one or more of the plurality of electronic fire sprinklers to output one or more corresponding flows of fluid to address the fire condition.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

Figure 1:
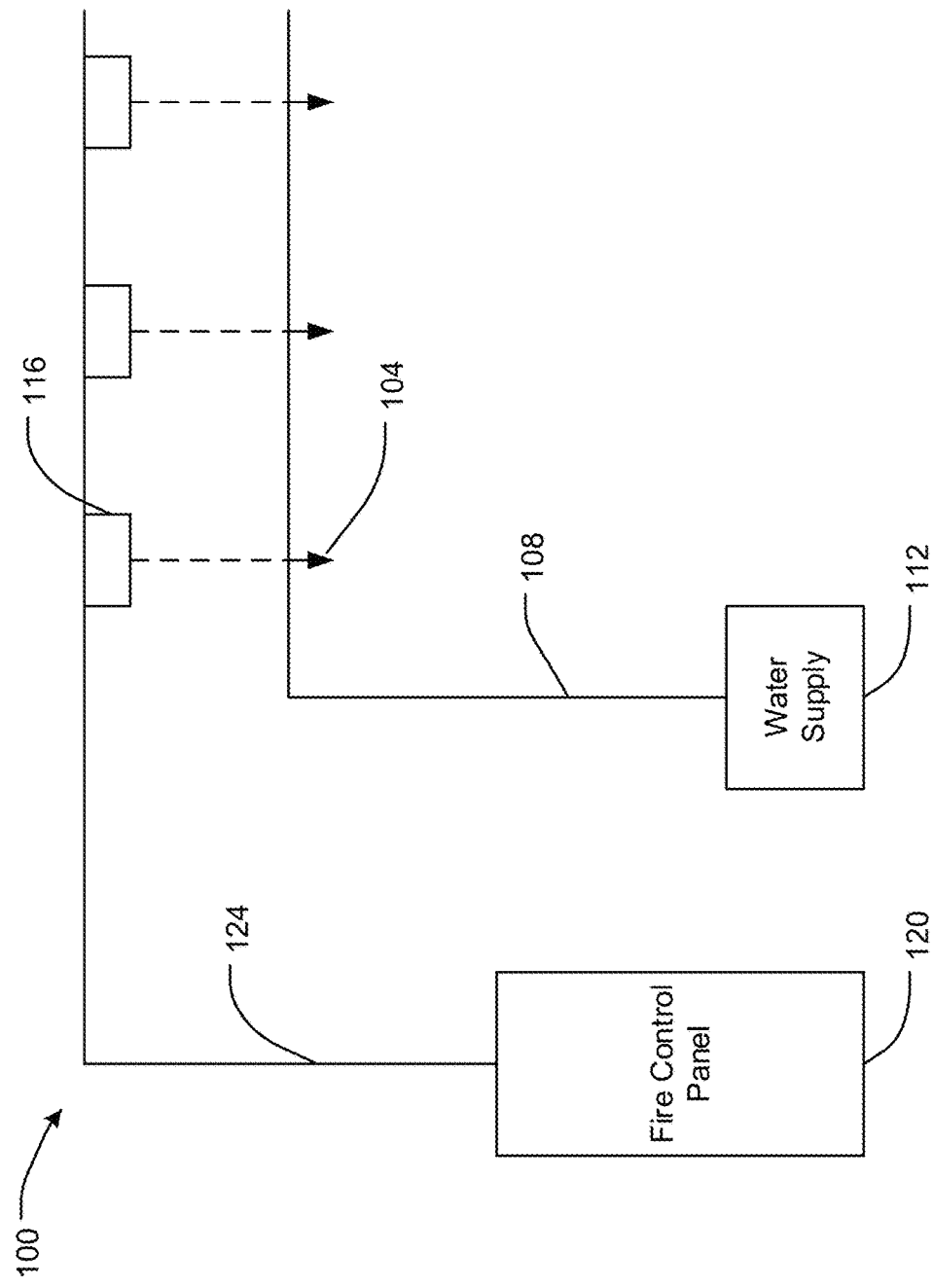
FIG. 1 is a block diagram of an electronic fire sprinkler system.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

The present disclosure relates generally to the field of fire sprinklers. More particularly, the present disclosure relates to real-time location systems and fire sprinklers. Electronic fire sprinklers can provide a significant improvement in both speed of activation and fire containment. As such, electronic fire sprinklers can enable taller buildings, increased storage heights, and increased operational flexibility. To achieve these performance gains, a system implementing electronic fire sprinklers should accurately select and actuate sprinklers around a fire early in the development of the fire. Increasing the location awareness of electronic fire sprinklers systems using a real time location system (RTLS) as described herein can improve system performance, including the accuracy and precision of fire-fighting, while reducing installation challenges.

The RTLS can allow for building height, configuration, and operations to be increased, such as for warehouses and fulfillment centers that are expected to be capable of handling a large range of goods and materials. The RTLS can enable buildings to have added ceiling height (e.g., the electronic fire sprinklers can be actuated, even in high ceiling situations where ceiling temperatures may be relatively slow to reach high values, early enough such that the fire may be adequately controlled), and to reduce the reliance on higher cost packaging materials in warehouses. For example, the RTLS can enable electronic fire sprinklers to be activated based on their location relative to a fire (e.g., relative to temperature sensors that detect a fire condition), rather than waiting for a threshold number of sprinklers to detect the fire condition before activation.

In some embodiments, the RTLS can locate a subject, such as an electronic fire sprinkler, within 10 cm accuracy and can communicate data via ultra-wideband (UWB) compliant wireless transceiver standards. An electronic fire sprinkler system implementing the RTLS can generate a topological map of the fire sprinkler network, such that the topological map can be used to control sprinkler actuation. The RTLS can perform wireless data communications; detecting location and temperature data; a distributed computing model; the capacity to manage more complex control algorithms; reducing costs by eliminating the need for a control panel; greater reliability and system integrity due to the use of multiple network devices (e.g., three devices provide three algorithmic network coordinators and three points of system reliability); programmatic addressing rather than manual addressing; and plug and play installation rather than onsite programming. As described herein, electronic sprinkler systems can use the RTLS to achieve superior performance in challenging applications like high ceilings with highly combustible commodities.

Referring to FIG. 1, an electronic fire sprinkler system 100 is depicted. The electronic fire sprinkler system 100 can operate an array of sprinklers surrounding a point of fire origin, during early stages of fire development, which can maximize an amount of water applied onto burning materials, and pre-wetting adjacent unburned fuels to prevent lateral fire spread. The electronic fire sprinkler system 100 can include an existing sprinkler platform modified to operate electrically and connected to an electronic detection and control system.

The electronic fire sprinkler system 100 can include a plurality of electronic fire sprinklers 104 coupled with a water supply 112 via one or more pipes 108. The one or more pipes 108 can include various piping components, such as manifolds, risers, and valves. The plurality of electronic fire sprinklers 104 can receive water from the water supply 112 through the one or more pipes 108. Each sprinkler 104 can activate in response to receiving an activation signal.

The electronic fire sprinkler 104 can switch from a first state that prevents output of water to a second state that allows output of water responsive to a fire condition. For example, the electronic fire sprinkler 104 can include a seal that prevents water flow through the electronic fire sprinkler 104, and an actuator that can adjust or remove the seal responsive to the fire condition, such as by being activated by a control signal from a remote device (e.g., a sensor 116) or responsive to activation of a thermal element (e.g., a metal element that deforms responsive to temperatures above a temperature threshold or a tube at least partially filled with fluid that breaks responsive to temperatures above the temperature threshold). The electronic fire sprinkler 104 can be an early suppression fast response (ESFR) sprinkler that includes a hook and strut link, which can be actuated to enable the electronic fire sprinkler 104 to flow water (e.g., via electrochemical actuation). The ESFR sprinkler can have a response time index (RTI) less than or equal to 50 $m^{1/2}s^{1/2}$.

The electronic fire sprinkler system 100 includes a plurality of sensors (e.g., temperature sensors, heat detectors, smoke sensors) 116. The temperature sensors 116 can detect a temperature and output an indication of the detected temperature to a fire control panel 120 via one or more communication lines 124. The smoke sensors 116 can detect an amount of smoke and output an indication of the detected smoke. The sensors 116 can detect fire conditions using various processes, such as rate of rise (ROR) of temperature or a fixed temperature threshold.

The sensors 116 can be coupled with one or more respective electronic fire sprinklers 104 to control operation of the one or more electronic fire sprinklers 104. For example, the sensors 116 can mechanically, electrochemically, or electronically actuate the one or more electronic fire sprinklers 104, such as in response to detecting an alarm condition, such as a smoke condition or fire condition, or in response to receiving instructions to actuate the one or more electronic fire sprinklers 104 from the fire control panel 120.

Each temperature sensor 116 can be a fire detection sensor, such as a sprinkler control heat sensor. Each temperature sensor 116 can include a processing circuit and communications interface in a manner similar to the network devices 204 described below, such as by including an ultra-wideband transceiver. Each temperature sensor 116 can detect a temperature and output an indication of the temperature. Each temperature sensor can detect the temperature, compare the temperature to a threshold temperature, and output an indication of a fire condition responsive to the detected temperature exceeding the threshold temperature. The temperature sensor 116 can output the indication using a control signal that causes the sprinkler(s) that receive the control signal to actuate a valve or otherwise initiate a flow of water to fight a fire.

The fire control panel 120 can be hard-wired to the sensors 116. The fire control panel 120 can be an addressable releasing panel, which can cause the sensors 116 to operate the electronic fire sprinklers 104 (e.g., using an actuation relay of the sensors 116). The fire control panel 120 can communicate an indication of a fire condition to a remote device. The fire control panel 120 can output an indication of an alarm responsive to detecting the alarm condition. The fire control panel 120 can maintain an identifier of each sensor 116 to associate the temperature received from each sensor 116 to the sensor 116, such as to determine which electronic fire sprinklers 104 to activate based on which sensor 116 indicates data corresponding to the alarm condition. Fire detection can be performed using the sensor 116 as an addressable heat detector (e.g., sprinkler control heat sensor), the actuation relay of the sensor 116, and supervised output (e.g., supervised output from the fire control panel 120). For example, the electronic fire sprinkler system 100 can include the electronic fire sprinkler 104 and the sprinkler control heat sensor 116 attached via a wiring harness to the electronic fire sprinkler 104; the detection and control system implemented by the fire control panel 120 can include the addressable heat sensors 116 being hard-wired to the fire control panel 120.

The fire control panel 120 can execute various algorithms to determine when an alarm condition is detected and when to operate particular electronic fire sprinklers 104 in response to the alarm condition. For example, the fire control panel 120 can execute at least one of a fire detection algorithm, a sprinkler selection algorithm, and a sprinkler release criteria algorithm. The fire detection algorithm can compare sensor data received from the sensors 116 to detect the alarm condition, such as by detecting the alarm condition responsive to temperature data exceeding a temperature threshold. The sprinkler selection algorithm and sprinkler release criteria algorithm can determine when and how to cause electronic fire sprinklers 104 to activate, such as by maintaining a count of electronic fire sprinklers 104 for which the attached sensors 116 have detected the fire condition, comparing the count to a threshold count, and activating the corresponding electronic fire sprinklers 104 responsive to the count exceeding the threshold count.

The electronic fire sprinkler system 100 can communicate all data via wired connections (e.g., wire communication lines 124), and while the fire control panel 120 monitors the integrity of the connection, if the wired data were to be compromised, fire protection may be compromised. For example, each individual sprinkler control heat sensor 116 may require manual addressing using a dual in-line package (DIP) switch, which can be error-prone.

Figure 2:
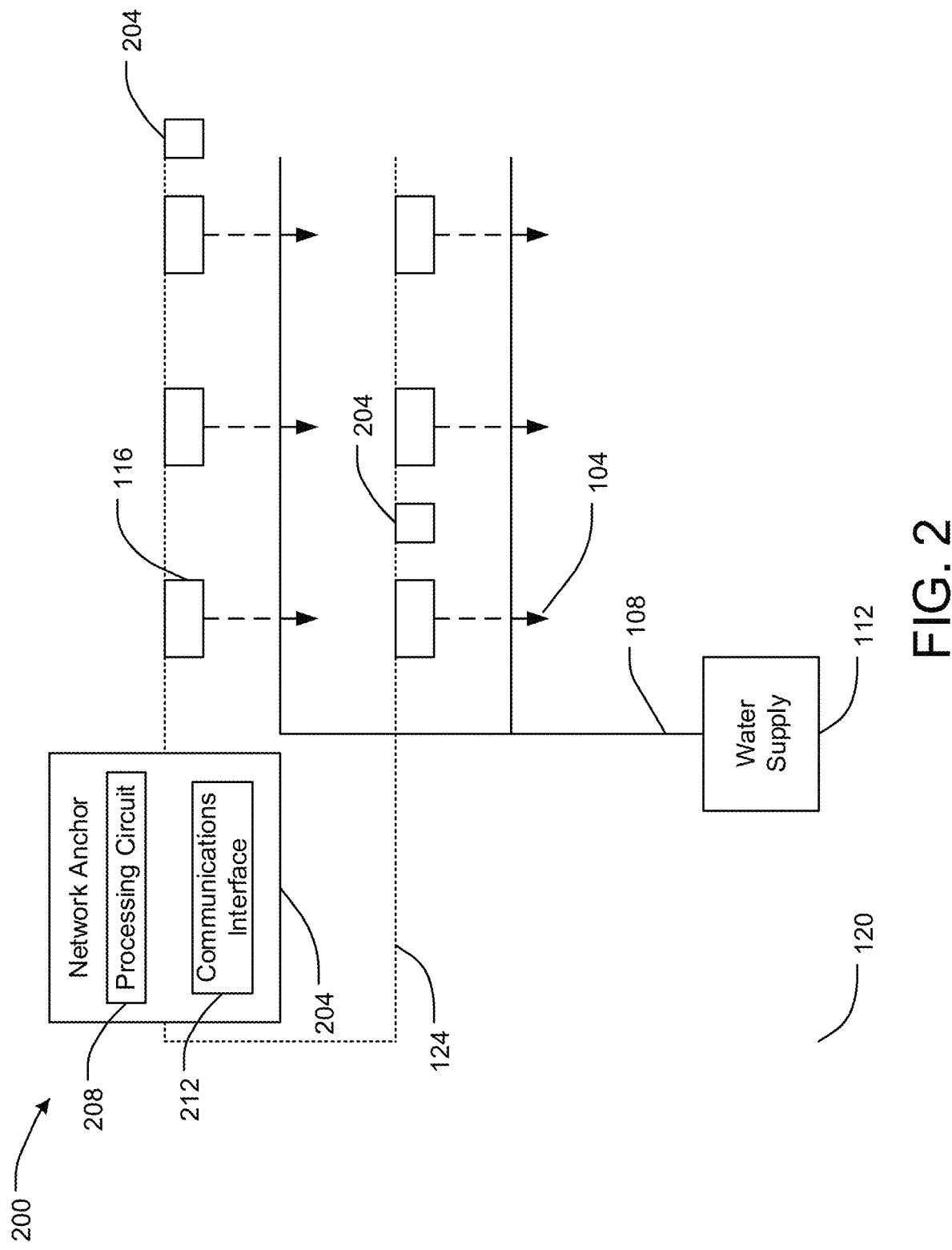
FIG. 2 is a block diagram of an electronic fire sprinkler system.

Referring to FIG. 2, an electronic fire sprinkler system 200 that implements an RTLS is depicted. The system of FIG. 2 may not require a fire control panel as shown in FIG. 1, but instead can use a plurality of network devices (e.g., network devices), which may be installed on a same plane as the sprinkler control heat sensors.

The RTLS implemented in the electronic fire sprinkler system 200 can enable location information to more accurately and precisely target sprinkler activation. For example, rather than relying on ceiling temperature (e.g., temperature at the ceiling where heat detectors are located) as a trigger condition—particularly, relying on a threshold number of sensors 116 that detect ceiling temperatures that reach a threshold temperature, without being aware of any spatial relationship between the sprinklers 104 to be actuated and the location of the fire—the present solution can use location information to reliably instruct any sprinkler grouping to operating without waiting for the threshold number of triggers to occur. As such, the electronic fire sprinkler system 200 can reliably respond to fires faster and limit fire growth for a variety of hazards.

The electronic fire sprinkler system 200 can incorporate features of the electronic fire sprinkler system 100. For example, the electronic fire sprinkler system 200 can include the plurality of electronic fire sprinklers 104 coupled with the water supply 112 via the one or more pipes 108. The electronic fire sprinkler system 200 can include sensors 116, which can control operation of respective electronic fire sprinklers 104.

The electronic fire sprinkler system 200 includes a plurality of network devices (e.g., network anchors) 204. The network devices 204 can be used to detect distances to the electronic fire sprinklers 104. As described further herein, the distances detected by the network devices 204 can be more accurate than other processes for determining sprinkler locations, particularly for situations in which there may be a large number (e.g., hundreds or thousands) of sprinkler locations to detect.

Each network device 204 can include a processing circuit 208 and a communications interface 212. The processing circuit 208 can include a processor and a memory. The processor may be a general purpose or specific purpose processor, an application specific integrated circuit (ASIC), one or more field programmable gate arrays (FPGAs), a group of processing components, or other suitable processing components. The processor may be configured to execute computer code or instructions stored in memory (e.g., fuzzy logic, etc.) or received from other computer readable media (e.g., CDROM, network storage, a remote server, etc.) to perform one or more of the processes described herein. The memory may include one or more data storage devices (e.g., memory units, memory devices, computer-readable storage media, etc.) configured to store data, computer code, executable instructions, or other forms of computer-readable information. The memory may include random access memory (RAM), read-only memory (ROM), hard drive storage, temporary storage, non-volatile memory, flash memory, optical memory, or any other suitable memory for storing software objects and/or computer instructions. The memory may include database components, object code components, script components, or any other type of information structure for supporting the various activities and information structures described in the present disclosure. The memory may be communicably connected to the processor via the processing circuit and may include computer code for executing (e.g., by processor) one or more of the processes described herein. The memory can include various modules (e.g., circuits, engines) for completing processes described herein.

The communications interface 212 may include wired or wireless interfaces (e.g., jacks, antennas, transmitters, receivers, transceivers, wire terminals, etc.) for conducting data communications with various systems, devices, or networks. For example, the communications interface 212 may include an Ethernet card and/or port for sending and receiving data via an Ethernet-based communications network. The communications interface 212 may include a wireless transceiver (e.g., a WiFi transceiver, a Bluetooth transceiver, a NFC transceiver, ZigBee, etc.) for communicating via a wireless communications network. The communications interface 212 may communicate via local area networks (e.g., a building LAN, etc.) and/or wide area networks (e.g., the Internet, a cellular network, a radio communication network, etc.) and may use a variety of communications protocols (e.g., BACnet, TCP/IP, point-to-point, etc.). The processing circuit can use the communications interface to communicate using a serial peripheral interface (SPI) protocol. The communications interface 212 can include an ultra-wideband transceiver, such as the DWM1000 transceiver described herein.

The network device 204 can use the communications interface 212 to detect a distance to one or more electronic fire sprinklers 104. For example, the network device 204 can cause the communications interface 212 to output a first wireless electronic signal (e.g., radio frequency signal), receive a second wireless electronic signal and detect the distance based on a time of flight corresponding to the first signal and the second signal. For example, the second wireless electronic signal can be a response signal received from the sensor 116 coupled with the electronic fire sprinkler 104. The network device 204 can process the response signal to identify a time of transmission and a time of receipt, and determine the distance based on the time of transmission and time of receipt. Where the sensors 116 are located on a same plane as the network devices 204, three network devices 204 can be used to detect the location of the sensor 116 (e.g., as described with reference to FIG. 3 below). Where the sensors 116 are located in three dimensions (e.g., some sensors 116 not on the same plane as other sensors 116), four network devices 204 can be used to detect the location of the sensor 116.

Ultra-wideband transceivers (e.g., DWM1000 modules manufactured by DecaWave) can be provided with each sensor 116 and each network device 204 (which can enable the sensors 116 and network devices 204 to communicate wirelessly). The ultra-wideband transceivers can be used to determine the locations of each sprinkler within the network and also to communicate data wirelessly. As such, the RTLS architecture can be analogous to a distributed computing model where each node in the network (sprinkler control heat sensor 116 or network device 204) cooperates in sharing algorithmic complexity, ensuring system reliability.

The electronic fire sprinkler system 200 can maintain a map of sprinkler locations (e.g., using the processing circuits 208 of the network devices 204). The electronic fire sprinkler system 200 can generate the map based on user data, such as by associating sprinkler locations to received data regarding each sprinkler address. The electronic fire sprinkler system 200 can use an identifying detector, such as a barcode or RFID-based system, to more accurately capture sprinkler address data.

The electronic fire sprinkler system 200 can use the sprinkler topology to determine which sprinklers should operate and when. The electronic fire sprinkler system 200 can select an optimal selection of sprinklers 104 to be operated in various situations.

The electronic fire sprinkler system 200 can selectively activate sprinklers 104 using the determined locations of the sprinklers 104. For example, the electronic fire sprinkler system 200 can include a policy, heuristic, or other set of rules which, when executed, identify at least one sprinkler 104 to be activated based on an activation signal being transmitted to another sprinkler 104. The rules may indicate a maximum distance between sprinklers 104 that should be activated together (e.g., if a first sprinkler 104 is activated, activate all other sprinklers 104 within five feet of the first sprinkler 104). The rules may include a maximum distance from a temperature sensor for activating sprinklers 104 (e.g., if the temperature at a first temperature sensor 116 is greater than a threshold temperature, activate all sprinklers 104 within ten feet of the first temperature sensor 116). As such, the electronic fire sprinkler system 200 can more accurately and precisely activate the sprinklers 104, even if ceiling temperatures in the vicinity of certain sprinklers 104 do not necessarily reach sufficient values that would otherwise independently activate the sprinklers 104.

Figure 3:
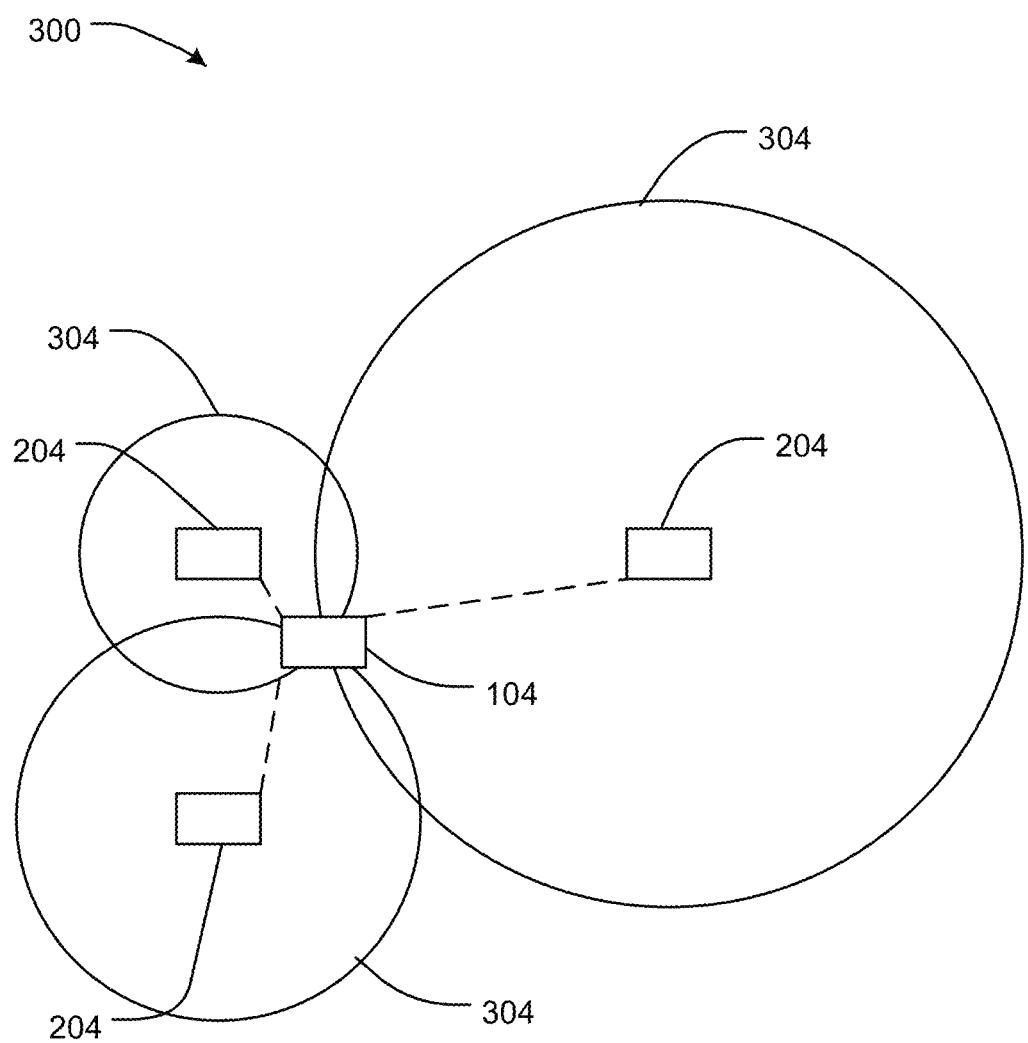
FIG. 3 is a schematic diagram illustrating trilateration with three devices and one sprinkler.

Referring to FIG. 3, a schematic diagram 300 of trilateration is depicted. As shown in FIG. 3, the electronic fire sprinkler system 200 can use three network devices 204 and an associated sprinkler 104 to perform trilateration. The electronic fire sprinkler system 200 can generate a sprinkler map using each network device 204 to define the location of each sprinkler 104 (e.g., within an area of a facility). It will be appreciated that the sprinkler plan may be two-dimensional, such that, as depicted in FIG. 3, each sprinkler can be located based on intersections of circles 304 associated with each ranges or distances from each of the three network devices 204. As such, the electronic fire sprinkler system 200 can define a sprinkler topology for each sprinkler.

The network devices 204 can execute a trilateration process to determine locations of the sprinklers 104. For example, a group of three network devices 204 can each output a detection signal to detect a corresponding sprinkler 104 (e.g., sensor 116 that actuates the sprinkler 104), and receive a return signal corresponding to the detection signal. Each network device 204 can determine a distance to the corresponding sprinkler 104 based on the return signal. The electronic fire sprinkler system 200 can determine an intersection of ranges, depicted as circles 304, corresponding to each distance to determine the location of the corresponding sprinkler 104. Each network device 204 can maintain a data structure including an identifier of each detected sprinkler 104 and a distance to each detected sprinkler 104, such that the electronic fire sprinkler system 200 can generate the sprinkler topology using the data structures. The network devices 204 may maintain data regarding sprinkler location up to a threshold distance from each network device 204. The threshold distance may be a sufficient distance such that an entire space occupied by the sprinklers can be expected to be covered by the trilateration, while reducing redundancy (which might complicate the sprinkler location determinations) and data storage requirements for each network device 204. Each of one or more predetermined regions may include three devices (network devices, temperature sensors) including the ultra-wideband transceivers, such that no redundancy occurs within each predetermined region. The temperature sensors can similarly be used to execute trilateration using the ultra-wideband transceivers.

Figure 4:
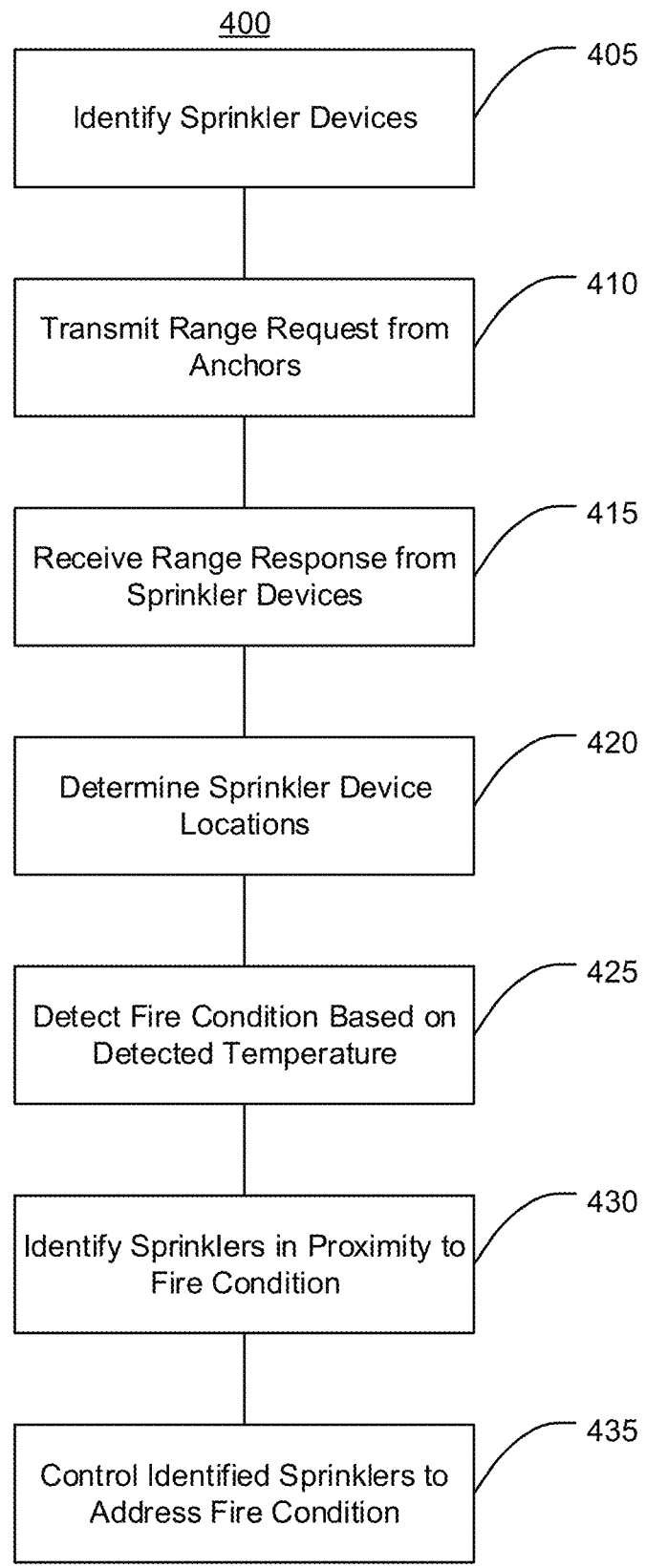
FIG. 4 is a flow diagram of a method of operating an electronic fire sprinkler system.

Referring now to FIG. 4, a method 400 of operating an electronic fire sprinkler system is depicted. The method 400 can be performed using various systems and devices described herein, such as electronic fire sprinklers 104 and the electronic fire sprinkler system 200.

At 405, one or more sprinkler devices can be identified. The sprinkler devices can be electronic fire sprinklers, which can be actuated from a first state to prevent fluid flow through the sprinkler to a second state allowing fluid flow through the sprinkler. For example, the electronic fire sprinkler can be electronically or electrochemically actuated. The electronic fire sprinkler can be an early suppression fast response (ESFR) sprinkler. The sprinkler device can be coupled with a sensor (e.g., heat detector, smoke detector) that can control operation of the sprinkler device. The sensor (or the sprinkler device) can include communications circuitry to perform wireless electronic communications, such as an ultra-wideband transceiver.

The sprinkler devices can be identified by network devices that can communicate with the sprinkler devices (e.g., with sensors coupled with the sprinkler devices). For example, each sensor can transmit an identification signal identifying the sensor (and thus the sprinkler device coupled with the sensor), which can be received by the network devices, enabling the network devices to generate a database of sprinkler devices. The identification signal can be transmitted using the communications circuitry. Each network device can maintain a database regarding sprinkler devices in range of the network device, which can reduce database size requirements by reducing redundancy. The database can indicate a sensor identifier (or sprinkler identifier) for each sensor (or sprinkler coupled with each sensor). The sprinkler devices can be identified responsive to user input, such as user input indicating a list of sensor identifiers (or sprinkler identifiers). The network devices can be or include ultra-wideband transceivers which can communicate wirelessly with the sensors or the sprinkler devices.

The network devices can assign a reply time to each sensor. The reply time can be different for each sensor, so that when the sensors are requested to communicate with the network devices, transmission collisions can be avoided. The sensors can be synchronized, such that a clock time of a clock operated by each sensor is within a threshold value of a synchronization time.

At 410, a range request can be transmitted from the network devices to the sprinkler devices. The network devices can generate the range request to request each sprinkler device to transmit a range signal to the network devices. The network devices can generate the range request to include the reply time, such as to include the reply time for each sensor identified based on the received identification signals. The network devices can use the ultra-wideband transceivers to transmit the range request.

At 415, the network devices receive range responses from the sprinkler devices. For example, each sprinkler device (or sensor associated with the sprinkler device) can retrieve, from the range request, a reply time assigned to the sprinkler device based on the sprinkler identifier of the sprinkler device. The sprinkler device can transmit the range response at the assigned reply time, such as by using the ultra-wideband transceiver.

At 420, the network devices can determine the locations of the sprinkler devices. For example, at least three network devices can receive the range response from a particular sprinkler device. Based on the range response, each of the network devices can determine a distance between the particular sprinkler device and the respective network device. Each network device can determine the distance based on evaluating the range response received from the particular sprinkler device. The network device can perform various time of flight techniques to determine the distance. The network device can compare the reply time assigned to the particular sprinkler device to the time at which the network device receives the range response to determine the distance.

The at least three network devices can determine the location of the particular sprinkler device based on the determined distance between each network device and the particular sprinkler device. For example, the at least three network devices can identify a point at an intersection of the determined distances between the network devices and the particular sprinkler device (e.g., a point corresponding to an intersection of circles or spheres having a radius corresponding to the determined distance). Three network devices can be used to determine the location where the network devices and the particular sprinkler device are located in a same plane (e.g., in a two-dimensional grid arrangement). Four network devices can be used to determine location where the network devices and the particular sprinkler device are not located in a same plane (e.g., in a three-dimensional arrangement, where at least one of the at least four network devices or the particular sprinkler device are not in the same plane).

Based on range responses received from each sprinkler device, the network devices can generate a map or topology of the sprinkler devices. For example, the network devices can associate the location of each sprinkler device to the sprinkler identifier of the sprinkler device in the database. The network devices can communicate the At 425, a fire condition can be detected. The fire condition can be detected based on sensor signals from the sensors, such as temperature signals or smoke detection signals. The sensors may output an indication of the fire condition. The sensors may provide the sensor signals to the network devices, which can process the sensor signals to detect the fire condition. The fire condition can be detected based on the temperature exceeding a temperature threshold, or a rate of rise of the temperature exceeding a rate of rise threshold. The fire condition can be detected without waiting for a threshold number of sensors to indicate the fire condition.

At 430, one or more sprinklers in proximity to the fire condition can be identified. The one or more sprinklers can be identified based on a location of at least one sensor used to detect the fire condition. For example, the one or more sprinklers can be identified using the database (which maintains the locations of sensors, sprinklers, and sensors associated with or coupled with sprinklers) to identify sprinklers that within a predetermined distance of the location of the at least one sensor. The predetermined distance can be a particular distance (e.g., less than twenty feet, less than ten feet). The predetermined distance can be a number of sprinklers away from the location of the at least one sensor (e.g., sprinklers in a first group adjacent to the at least one sensor; sprinklers in a first group adjacent to the at least one sensor and a second group adjacent to the first group).

At 435, the one or more sprinklers can be controlled to address the fire condition. For example, responsive to identifying the one more sprinklers, activation signals can be transmitted to cause the one or more sprinklers to activate to flow fluid to address the fire condition. The activation signals can be generated by one or more network devices, and transmitted to the sensor(s) that can actuate the one or more sprinklers. For example, at least one of the network devices can generate a plurality of activation signals and transmit the plurality of activation signals to the sensors that are coupled with the identified one or more sprinklers. The activation signals may include an identifier of the sensor to be used to activate the identified one or more sprinklers, such that each sensor can process the activation signal to determine whether to activate the sprinkler with which the sensor is coupled. The identified one or more sprinklers can be activated even if each of the sensors with which the identified one or more sprinklers are coupled have not detected a fire condition, such as if the sensors are relatively high above the source of the fire condition such that a temperature near the sensors is not sufficient to enable the sensors to detect the fire condition.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. An electronic fire sprinkler system, comprising:
   an electronic fire sprinkler;
   a sensor to detect a temperature and output an indication of the detected temperature;
   a first network device to detect a distance to the electronic fire sprinkler based on a time of transmission, by the first network device, of a first radio frequency (RF) signal to the sensor, the sensor corresponding to the electronic fire sprinkler, and based on a time of receipt, by at least one of the first network device or a second network device, of a second RF signal from the sensor; and
   a processing circuit to:
      receive a plurality of detected distances from at least one of the first network device or the second network device, the plurality of detected distances including the detected distance to the electronic fire sprinkler;
      execute a trilateration algorithm to determine a location of the electronic fire sprinkler based on the plurality of detected distances;
      determine that a fire condition is present based on the indication of the detected temperature;
      identify the electronic fire sprinkler based on the determined location and an identifier of the sensor; and
      transmit an activation signal to the electronic fire sprinkler to cause the electronic fire sprinkler to output fluid.

2. The electronic fire sprinkler system of claim 1, wherein the electronic fire sprinkler is a first electronic fire sprinkler of a plurality of electronic fire sprinklers and wherein the first network device and the second network device are network devices of a plurality of network devices, comprising:
   the plurality of electronic fire sprinklers arranged in a two-dimensional arrangement; and
   the plurality of network devices include at least three network devices to detect respective distances to the first electronic sprinkler of the plurality of electronic fire sprinklers responsive to a determination that the detected temperature is greater than a temperature threshold corresponding to an alarm condition.

3. The electronic fire sprinkler system of claim 1, wherein:
   the first network device and the second network device are network devices of a plurality of network devices that includes at least four network devices to detect respective distances to the electronic first sprinkler.

4. The electronic fire sprinkler system of claim 1, wherein the electronic fire sprinkler is a first electronic fire sprinkler of a plurality of electronic fire sprinklers, comprising:
   the plurality of electronic fire sprinklers arranged in a three-dimensional arrangement.

5. The electronic fire sprinkler system of claim 1, comprising:
   the time including a time of flight corresponding to the first signal and the second signal.

6. The electronic fire sprinkler system of claim 1, comprising:
   the electronic fire sprinkler having a response time index (RTI) less than or equal to $50 \ m^{1/2}s^{1/2}$.

7. The electronic fire sprinkler system of claim 1, comprising:
   the processing circuit to identify the electronic fire sprinkler based on a maximum distance from the sensor.

8. The electronic fire sprinkler system of claim 1, wherein the electronic fire sprinkler is a first electronic fire sprinkler, comprising:
   a second electronic fire sprinkler; and
   the processing circuit to identify the first electronic fire sprinkler as being closer to the sensor than the second electronic fire sprinkler is to the sensor; and the processing circuit configured to identify the second electronic fire sprinkler as being within a threshold distance of the first electronic fire sprinkler.

9. The electronic fire sprinkler system of claim 1, comprising:
at least one of the first network device or the second network device configured to operate the processing circuit; and
the processing circuit configured to maintain a map of locations of the first network device and the second network device.

10. The electronic fire sprinkler system of claim 1, comprising:
at least one of the first network device or the second network device configured to detect the distance to the electronic fire sprinkler based on communication with the sensor.

11. A method, comprising:
detecting, by a sensor, a temperature;
detecting, by a first network device, a distance to an electronic fire sprinkler based on a time of transmission, by the first network device, of a first RF signal to the sensor, the sensor corresponding to the electronic fire sprinkler, and based on receipt, by at least one of the first network device or a second network device, of a second RF signal from the sensor;
determining, by one or more processors, a location of the electronic fire sprinkler by applying trilateration to a plurality of detected distances including the distance to the electronic fire sprinkler;
detecting, by the one or more processors, a fire condition based on the detected temperature;
identifying, by the one or more processors, the electronic fire sprinkler based on the determined location and based on an identifier of the sensor; and
transmitting, by the one or more processors, an activation signal to the electronic fire sprinkler to cause the electronic fire sprinkler to output fluid to address the fire condition.

12. The method of claim 11, comprising:
detecting, by at least three network devices including the first network device and the second network device, respective distances to the electronic fire sprinkler in response to the detected temperature being greater than a temperature threshold corresponding to an alarm condition.

13. The method of claim 11, comprising:
detecting, by at least four network devices including the first network device and the second network device, respective distances to the electronic fire sprinkler in response to the detected temperature being greater than a temperature threshold corresponding to an alarm condition, the at least four network devices arranged in at least one of a two-dimensional arrangement or a three-dimensional arrangement.

14. The method of claim 11, comprising:
maintaining, by the one or more processors, a map of locations of the first network device and the second network device.

15. The method of claim 11, wherein the time is a time of flight corresponding to at least one of the first signal or the second signal.

16. The method of claim 11, comprising:
the electronic fire sprinkler having a response time index (RTI) less than or equal to 50 $m^{1/2}s^{1/2}$.

17. The method of claim 11, comprising:
identifying, by the one or more processors, the electronic fire sprinkler based on a distance from the sensor.

18. The method of claim 11, comprising:
identifying, by the one or more processors, the electronic fire sprinkler as a first electronic fire sprinkler closest to the sensor; and
identifying a second electronic fire sprinkler within a threshold distance of the first electronic fire sprinkler.

19. The method of claim 11, comprising:
detecting, by at least one of the first network device or the second network device, the fire condition.

20. The method of claim 11, comprising:
detecting, by the first network device, the distance by communicating with the sensor, wherein the sensor is coupled with the electronic fire sprinkler.

\* \* \* \* \*